(12) United States Patent
Jopp et al.

(10) Patent No.: US 7,775,481 B2
(45) Date of Patent: Aug. 17, 2010

(54) DEVICE FOR HEATING LOCK ELEMENTS IN AIRCRAFT

(75) Inventors: Ulf-Werner Jopp, Elmshorn (DE); Juergen Meisiek, Muensterdorf (DE)

(73) Assignees: ESW GmbH, Wedel (DE); Airbus Deutschland GmbH, Hamburg (DE)

( * ) Notice: Subject to any disclaimer, the term of this patent is extended or adjusted under 35 U.S.C. 154(b) by 751 days.

(21) Appl. No.: 11/112,478

(22) Filed: Apr. 22, 2005

(65) Prior Publication Data

US 2005/0236522 A1   Oct. 27, 2005

(30) Foreign Application Priority Data

Apr. 24, 2004   (DE) .................. 10 2004 020 662

(51) Int. Cl.
*B64D 15/12*   (2006.01)
(52) U.S. Cl. ................ 244/134 D; 244/129.5; 219/466.1; 392/435
(58) Field of Classification Search ............. 244/129.4, 244/134 R, 134 D, 134 E, 1 R, 129.1, 133, 244/129.5; 392/435; 219/466.1, 544, 546, 219/548, 549, 543, 528, 212, 213; 292/DIG. 66
See application file for complete search history.

(56) References Cited

U.S. PATENT DOCUMENTS

| | | | | |
|---|---|---|---|---|
| 1,715,202 A | * | 5/1929 | Lewis .................... 244/134 B |
| 2,512,875 A | * | 6/1950 | Reynolds et al. ............. 392/435 |
| 2,932,719 A | * | 4/1960 | Godden .................... 219/545 |
| 2,952,761 A | * | 9/1960 | Smith-Johannsen ......... 219/541 |
| 3,218,436 A | * | 11/1965 | Edwards et al. ............. 219/544 |
| 3,397,302 A | * | 8/1968 | Hosford .................... 219/528 |
| 3,697,728 A | * | 10/1972 | Stirzenbecher ............. 219/548 |
| 4,135,490 A | * | 1/1979 | Soleau, Jr. ................. 126/712 |
| 4,733,057 A | * | 3/1988 | Stanzel et al. ............... 219/548 |
| 4,743,740 A | * | 5/1988 | Adee ......................... 219/548 |
| 5,004,895 A | * | 4/1991 | Nishino et al. .............. 219/528 |
| 5,301,905 A | * | 4/1994 | Blaha ....................... 244/134 F |
| 5,492,661 A | * | 2/1996 | Weddigen et al. ........... 264/109 |
| 5,547,622 A | * | 8/1996 | Chalasani et al. ........... 264/122 |
| 5,553,815 A | * | 9/1996 | Adams et al. ........... 244/134 R |
| 5,597,502 A | * | 1/1997 | Watanabe et al. ........... 219/528 |
| 5,609,314 A | * | 3/1997 | Rauckhorst et al. ..... 244/134 A |

(Continued)

FOREIGN PATENT DOCUMENTS

DE   7500149   *   1/1975

*Primary Examiner*—Benjamin P Lee
(74) *Attorney, Agent, or Firm*—Frommer Lawrence & Haug LLP

(57) ABSTRACT

The invention is directed to a device for heating lock elements in aircraft, in particular to prevent icing up of door locks and emergency slide locks. The object of the invention, to find a novel possibility for heating lock elements in aircraft, particularly for preventing icing of door locks and emergency slide locks, which reliably eliminates icing of the lock elements without requiring frequent maintenance and repair due to high mechanical, chemical and thermal stresses, is met according to the invention in that a base body which is mounted in the floor of the aircraft and contains an insert profile has an integrated, inserted sliding plate and in that the sliding plate is hollowed out from the bottom over a large surface to receive a heating foil, wherein the heating foil is embedded in the hollowed out recess in a sandwich-type construction, and the sliding plate is hermetically sealed from the bottom.

12 Claims, 5 Drawing Sheets

U.S. PATENT DOCUMENTS

| | | | |
|---|---|---|---|
| 5,865,397 A * | 2/1999 | Herrmann | 244/14 |
| 5,895,728 A * | 4/1999 | Walker et al. | 429/53 |
| 6,417,125 B1 * | 7/2002 | Rorabaugh et al. | 501/95.1 |
| 6,483,086 B1 * | 11/2002 | Wolff et al. | 219/528 |
| 6,611,659 B2 * | 8/2003 | Meisiek | 392/435 |
| 6,834,159 B1 * | 12/2004 | Schramm | 392/435 |
| 7,078,658 B2 * | 7/2006 | Brunner et al. | 219/529 |
| 7,211,772 B2 * | 5/2007 | Carpino et al. | 219/528 |
| 2003/0172856 A1 * | 9/2003 | Hofmann et al. | 110/338 |
| 2004/0075528 A1 * | 4/2004 | Carbin et al. | 338/307 |
| 2004/0094530 A1 * | 5/2004 | DeBenedetto et al. | 219/213 |
| 2006/0043240 A1 * | 3/2006 | Hindel et al. | 244/133 |
| 2006/0278631 A1 * | 12/2006 | Lee et al. | 219/529 |

* cited by examiner

DEVICE FOR HEATING LOCK ELEMENTS IN AIRCRAFT

CROSS-REFERENCE TO RELATED APPLICATION

This application claims priority of German Application No. 10 2004 020 662.7, filed Apr. 24, 2004, the complete disclosure of which is hereby incorporated by reference.

BACKGROUND OF THE INVENTION a) Field of the Invention

The invention is directed to a device for heating lock elements in aircraft, in particular to prevent icing of door locks and emergency slide locks.

b) Description of the Related Art

The lock of emergency exits, particularly those with inflatable emergency slides, is subject to special requirements to ensure the safety of passengers during landing and in emergency situations.

On one hand, it is not possible to provide thermal insulation at the aircraft floor in the lower door area because of the space that must be kept clear on the outer side for emergency slides, so that the lock elements would assume the outside temperature during flight at an altitude of several thousand meters, ice up without heating, and accordingly freeze solid. Further, the locks are exposed to extreme changes in temperature (up to 100 Kelvin) during the course of each flight. On the other hand, the lock elements for receiving the door locking bolts are located directly in the access area of the exit and therefore may have only a minimum structural height and are subject to high mechanical and chemical loading (e.g., chemical cleaning and deicing agents).

Current state of the art primarily employs hot air blowers at the lock elements of exits with emergency slides, since there is usually no space for thermal insulation and hot air supply lines or direct heaters at the lock elements below the aircraft flooring in the door or emergency slide area. However, due to the fact that the door locks are connected virtually directly to the aircraft skin, the air flow of the hot air blower must have a considerable temperature and flow rate in order to safely prevent icing of the door lock. However, air flows with temperatures greater than 45° C. and high airflow speeds are highly unpleasant when coming into contact with human skin and lead to unwanted heating of room air and drying of the air in continuous operation. In order to minimize these side-effects while nevertheless safely eliminating icing depending on the outside temperature, the hot air blowers would have to be controlled by sensors which can operate in an optimal manner only in direct contact with the lock element. Further, hot air blowers with alternating thermal loading are relatively prone to malfunction and are far less effective than a direct heating of the lock elements by heat conduction and heat radiation. However, ceramic surface heaters have not been successful as direct heating up to this point because of a partly indefinable thermomechanical and chemical requirement profile during flying operation due to unacceptable failure rates (particularly due to cracking caused by alternating mechanical and thermal loads in conjunction with chemical influences).

OBJECT AND SUMMARY OF THE INVENTION

It is the primary object of the invention to find a novel possibility for heating lock elements in aircraft, particularly for preventing icing of door locks and emergency slide locks, which reliably eliminates icing of the lock elements without requiring frequent maintenance and repair due to high mechanical, chemical and thermal stresses.

In a device for heating lock elements in aircraft, in particular for door locks and emergency slide locks, in which intermeshing lock elements which can ice during flying operation are provided, preferably a body with an insert profile and a lock slide which is inserted into the insert profile, this object is met, according to the invention, in that a base body which is mounted in the floor of the aircraft and contains the insert profile has an integrated, inserted sliding plate, and in that the sliding plate is hollowed out from the bottom over a large surface to receive a heating foil, wherein the heating foil is embedded in the hollowed out recess in a sandwich-type construction and the sliding plate is hermetically sealed from below.

The sandwich construction advantageously comprises two high-temperature resistant woven mats and the heating foil which is arranged therebetween.

In order to receive the sandwich construction of the heating foil, the recess is advisably introduced into the sliding plate in such a way that there remains only a circumferential, stable edge corresponding to the shape of the sliding plate. The recess is advantageously routed out of the sliding plate for receiving the sandwich construction.

The recess of the sliding plate with the sandwich construction comprising the heating foil and woven mats is advisably filled with liquid ceramic in order to fill it and achieve a good thermal transition from the heating foil to the sliding plate.

Further, it is advantageous when the sliding plate has a cover plate over its entire surface as a bottom closure which is welded around the circumference in order to achieve a stable and hermetic closure. The cover plate advisably has a sleeve that is welded into the cover plate for guiding the connection wires of the heating foil out of the sliding plate.

Further, it has proven advantageous that the sliding plate is screwed to the underside of the base body in a sealing manner by the sleeve by means of a conical nut.

The heating foil is advisably a metal resistance foil. It is preferably an aluminum-chrome foil and advantageously has a zigzag structure over its entire surface inside the recess of the sliding plate.

For purposes of temperature regulation, at least one sensor is advisably arranged at the base body for regulating the flow of heat by means of a control unit.

Further, it is advantageous to arrange at least one safety switch at the base body to protect against overheating of the base body and of the heating foil. The safety switch is preferably a bimetal switch.

The solution according to the invention makes it possible to heat lock elements in aircraft, in particular door locks and emergency slide locks, in such a way that an icing of the lock elements is reliably prevented without frequent maintenance and repairs due to high mechanical, chemical and thermal loading of the lock elements.

The invention will be described in more detail in the following with reference to an embodiment example.

DESCRIPTION OF THE PREFERRED EMBODIMENTS

Figure 1:
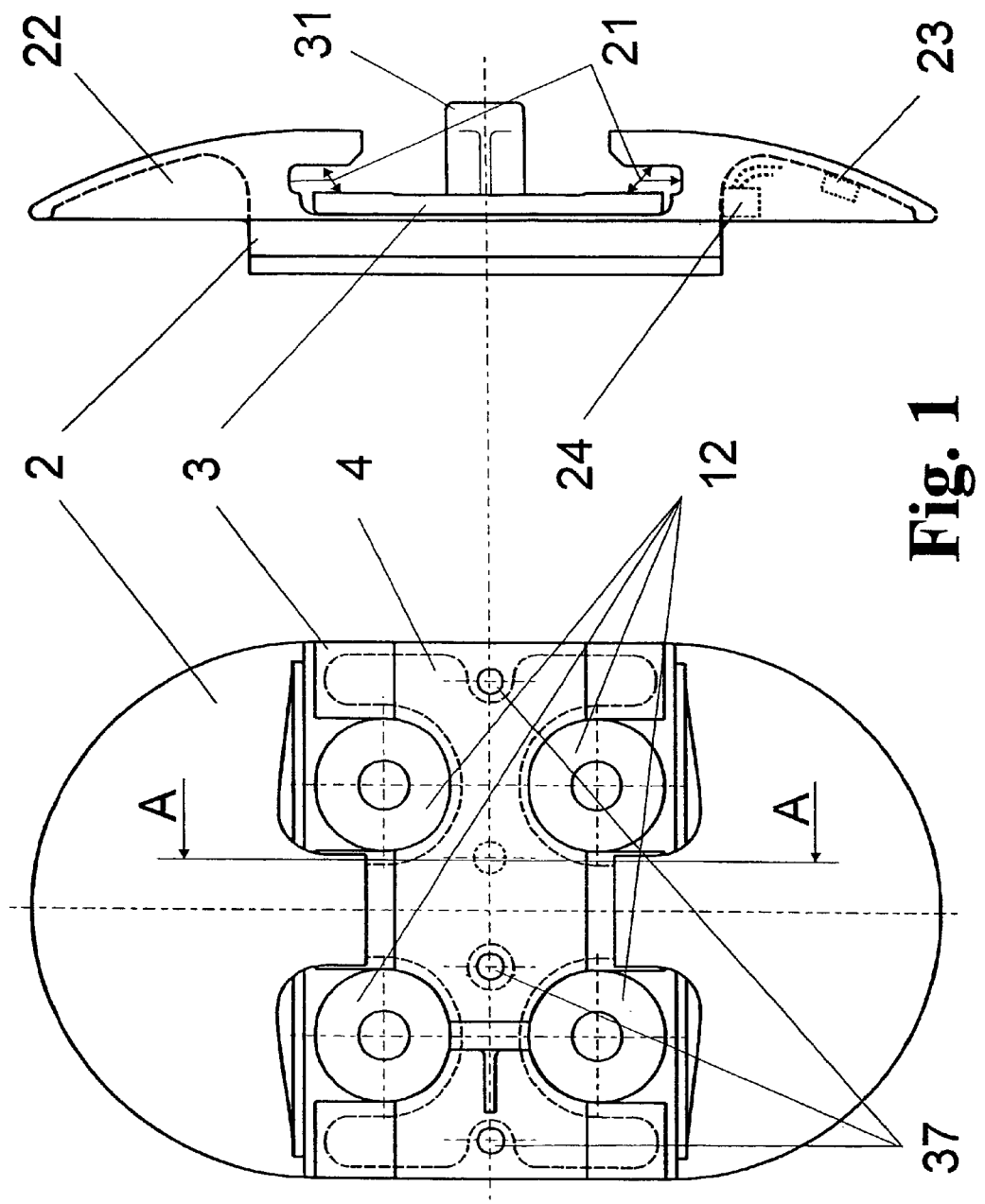
FIG. 1 shows a schematic top view and side view of the device according to the invention.
Figure 2:
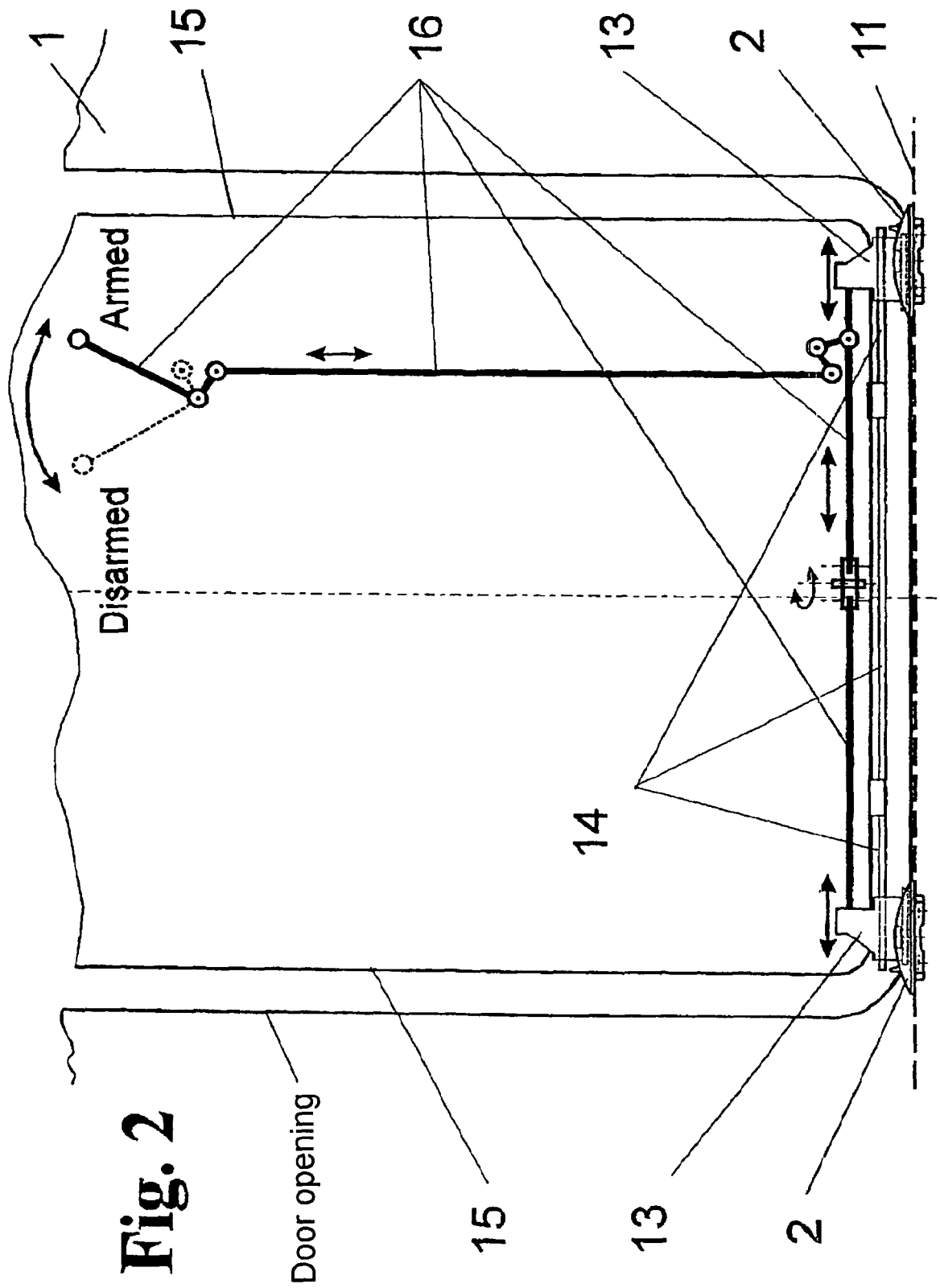
FIG. 2 shows the inside of the door area.
Figure 3:
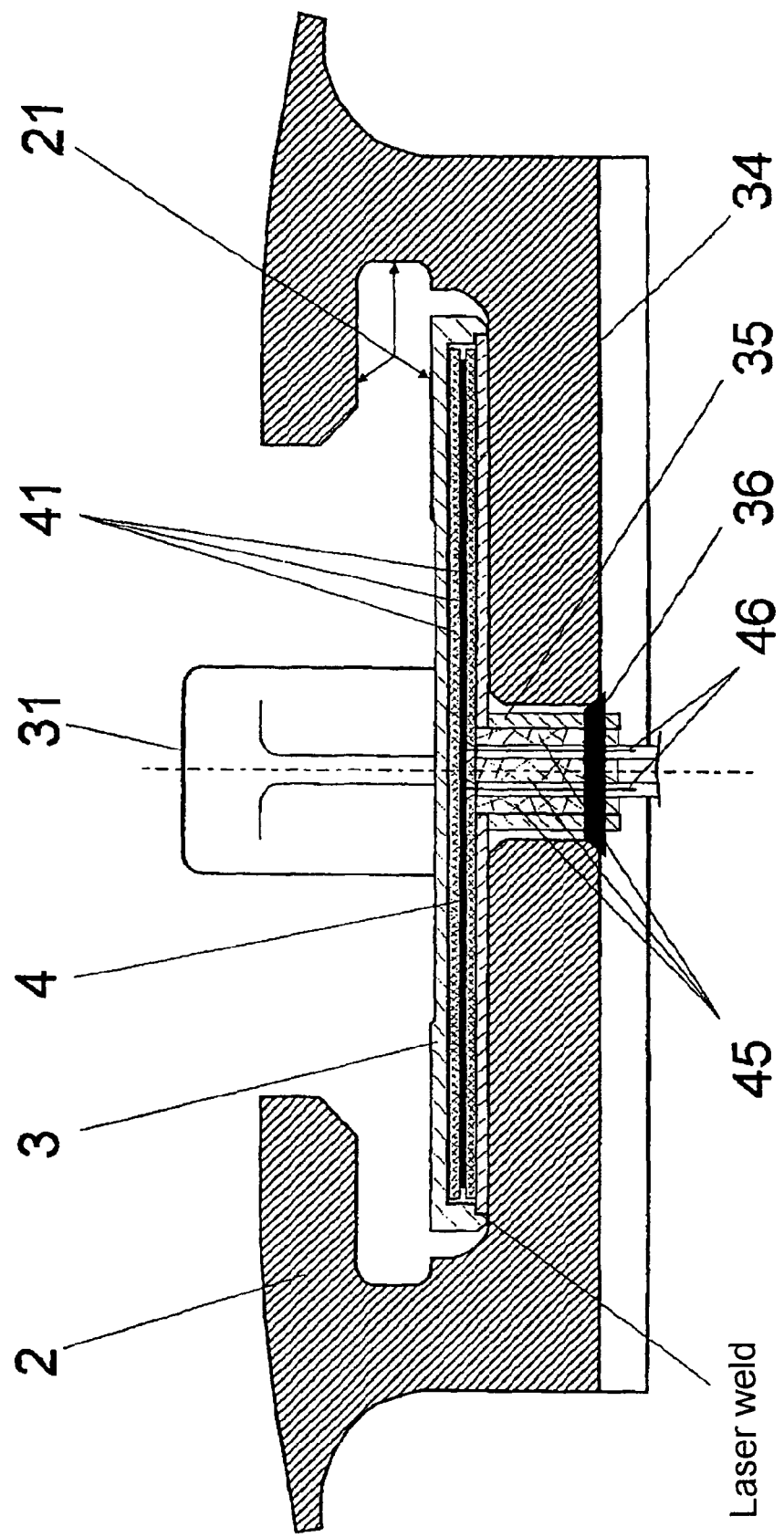
FIG. 3 is a sectional view along line A-A of FIG. 1.

As can be seen from FIGS. 1, 2 and 3 combined, the device according to the invention basically comprises a base body 2, which is inserted so as to rest in the floor 11 of the aircraft fuselage 1 and is anchored in the floor 11 by four fastening screws 12, and an insert profile 21 for a lock slide 13 which, when locked together with the insert profile 21 of the base body 2, resembles a dovetail guide. The lock slide 13 is displaced linearly on a guide rail 14 arranged at the aircraft door 15 by means of a lever mechanism 16.

A slide plate 3 with a stop pin 31 or stop plate, which is embedded in the base body 2, is provided for the inserted lock slide 13 at the base of the insert profile 21 of the base body 2. The insert profile 21 is accordingly provided as a free space for the lock slide 13, at the top partially and at the sides completely, through the base body 2 and at the base surface through the base plate 3.

A heating foil 4 is provided for heating the sliding plate 3. The heating foil 4 is accommodated below the sliding surface in the sliding plate 3 itself and—since exclusively the sliding plate 3 is to be used for accommodating it—has an overall height of about 1.5 mm. The sliding plate 3 does not exceed a height of about 2 mm.

The basic function of the lock element for aircraft doors with emergency slides is shown schematically in FIG. 2.

When the lever mechanism 16 is set in the armed lever position by manual actuation, two lock slides 13 at the aircraft door 15 are pulled out of the insert profile 21 of the two base bodies 2 in opposite directions to one another and the emergency slides are released for activation.

When the lever mechanism 16 is moved into the disarmed lever position, the lock slides 13 are pushed into the insert profile 21 of the base body 2 again and accordingly produce the locked state.

Due to the absence of thermal insulation below the floor 11 in the area of the aircraft door 15, the lock elements, in particular the base body 2 with the sliding plate 3 and the inserted lock slide 13, take on the approximate outside temperature during flight. Due to precipitated condensation water on the above-mentioned lock elements, the latter freeze together and must be deiced by heating at the correct time prior to use. For this purpose, an electric heater is accommodated in the base body 2 and is integrated in the sliding plate 3 due to lack of space as well as to increase efficiency.

Figure 4:
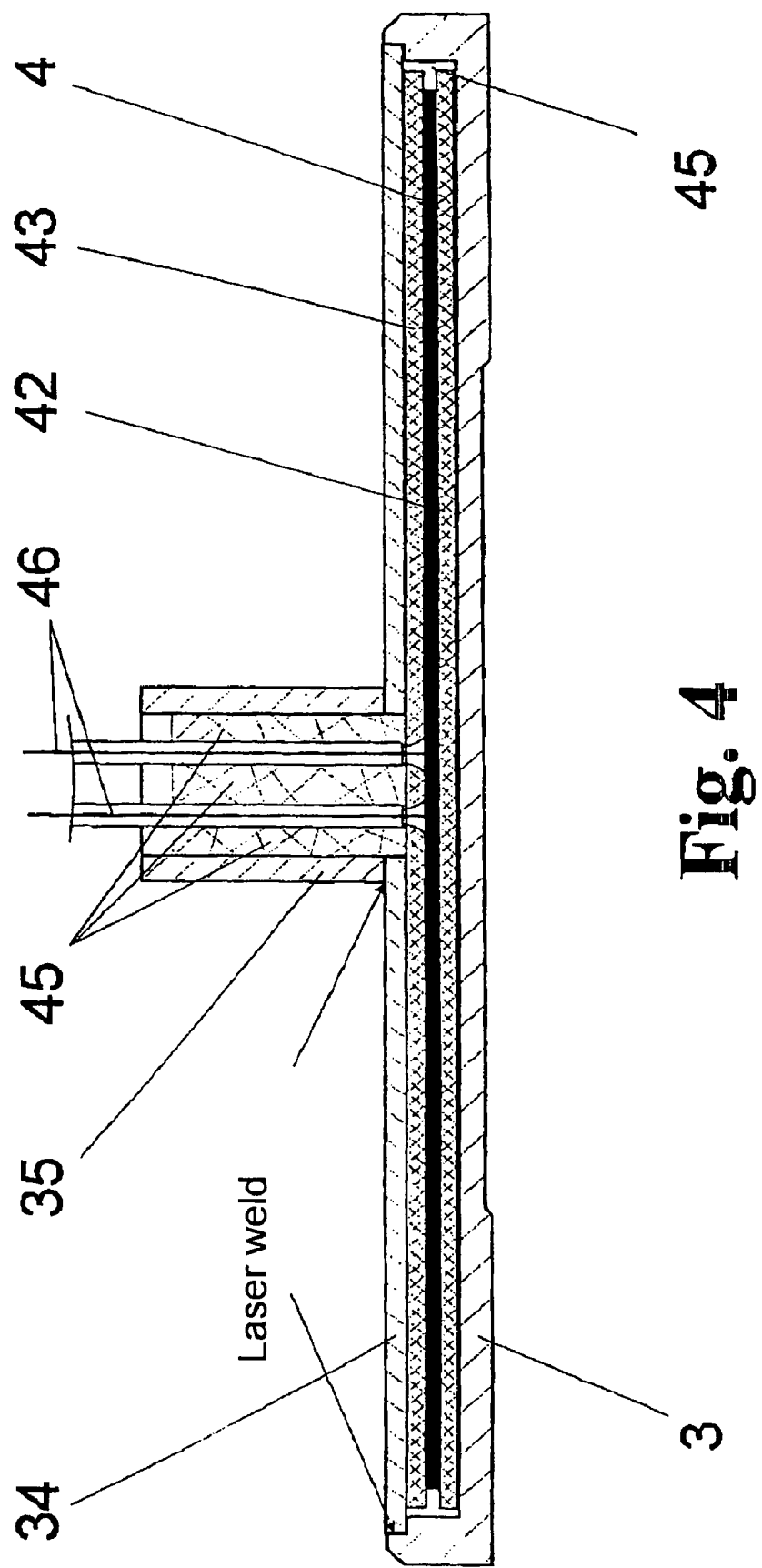
FIG. 4 is a detailed sectional view of the sliding plate in an inverted position for introducing the heating foil and insulating layers.

The heated sliding plate 3 is produced in that it is routed out from the bottom and the resulting recess 32, as is shown in FIG. 4, is used for embedding a heating foil 4 in a sandwich construction 41. After producing the recess 32, the sliding plate 3 has a completely circumferential, stable edge 33 as can be seen from FIG. 5.

Figure 5:
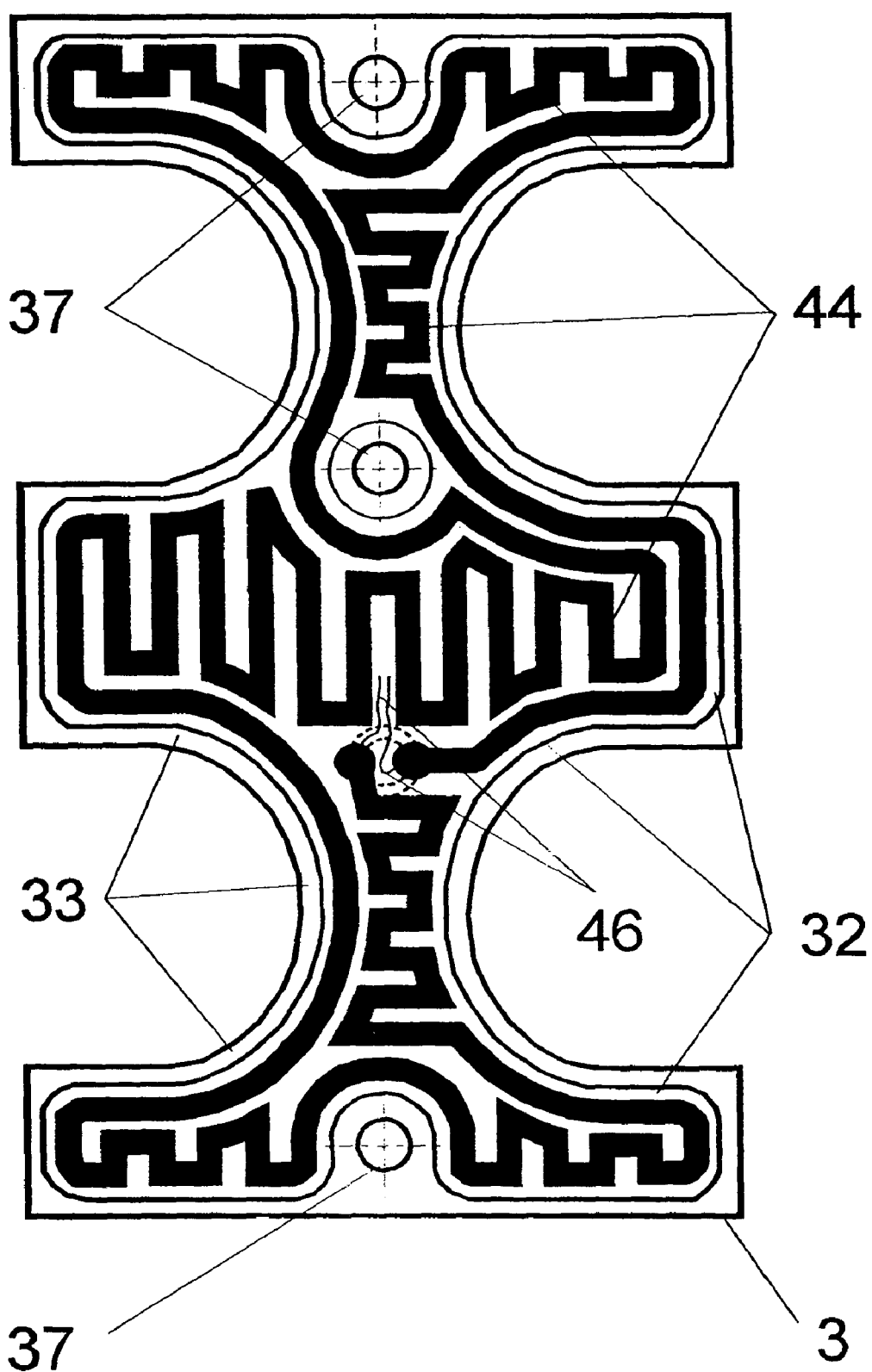
FIG. 5 shows an embodiment form of the sliding plate with aluminum-chrome heating foil using the entire surface of the sliding plate.

FIG. 4 shows the inverted, routed sliding plate 3 with the recess 32 at the top. For the sandwich construction 41 of the heating foil 4, a first glass or ceramic woven layer 42 is initially inserted into this recess 32, and the heating foil 4, preferably an etched aluminum-chrome foil in the form of a zigzag structure 44 as is shown by way of example in FIG. 5, is placed on this first glass or ceramic woven layer 42. The heating foil 4 is covered by a second glass or ceramic woven layer 43 in an insulating manner and the sandwich construction 41 is impregnated with a hardenable liquid ceramic 45. Finally, the sliding plate 3 is fixedly connected to a cover plate 34 that is welded with a sleeve for guiding through the connection wires 46 of the heating foil 4 by means of a circumferential laser weld.

The sliding plate 3 arranged in this way is then completely filled with liquid ceramic 45 which is poured under vacuum and hardened in order to prevent trapped air. The woven layers 42 and 43 are also automatically impregnated by the liquid ceramic 45 and, after hardening, bring about a reliable fixing and an insulation that is very long-wearing and highly effective electrically.

According to FIG. 3, the sliding plate 3 is fixed over the sleeve 35 by means of a conical nut 36 at the underside of the base body 2. Further, locking screws 37 are screwed from the top through the sliding plate 3 into the base body 2 as can be seen in FIG. 1.

The sliding plate 3 is hermetically sealed against chemical environmental influences by the circumferential laser weld and the ceramic filling. The heating foil 4 is completely enclosed and, further, thanks to the sandwich construction 41, is to a certain degree not breakable when acted upon by excessive force. Depending upon the selection of material, the heating foil 4 by itself is stable at temperatures from 500° C. to 1000° C. or higher.

With a complex shape (see FIG. 5) and small structural height (up to 1.5 mm), the sliding plate 3 combines the actual sliding and stop function with the function of a heating element with high thermal and mechanical performance. The mechanical functionality of the sliding plate 3 is ensured at low surrounding temperatures (below 0° C.) by heating with a heating output of about 120 W and temperature of at least 270° C.

The heating output is usually not permanently applied by the heating foil 4; rather, a thawing of ice is required within 20 minutes at temperatures of −40° C. (temperature of the lock element≈outside temperature). For this purpose, a sensor 23 is fastened in a cavity 22 of the base body 2 (see FIG. 1) and regulates the heat output by means of a control unit (not shown) after switching on the flow supply to the heating foil 32. In addition, a safety switch 24 can also be accommodated in the cavity 22 to prevent overheating. The safety switch 24, which is constructed as a bimetal switch, interrupts the heating flow supply to the heating foil 4 when a threshold temperature is exceeded or ensures safe emergency operation in case of outage of the heat flow regulation.

The operating times and the heating output are accordingly limited in a suitable manner, which also results in a longer service life of the heated sliding plate 3 inside the base body 2 of the lock element.

Further, the sliding plate 3 with the integrated heating foil 4 is relatively simple to replace in case the heating function should ever fail. In this case, as can be seen from FIGS. 1 and 3, it is possible to exchange the entire sliding plate 3 by loosening three locking screws 37 in the base body 2 and the conical nut 36 that is screwed to the base body 2 from below on the sleeve 35 of the cover plate 34 and removing a plug connector (not shown) for the connection wires 46 of the heating foil 4.

While the foregoing description and drawings represent the present invention, it will be obvious to those skilled in the art that various changes may be made therein without departing from the true spirit and scope of the present invention.

REFERENCE NUMBERS 1 aircraft fuselage
11 floor
12 fastening screws
13 lock slide
14 guide rail
15 aircraft door
16 lever mechanism
2 base body
21 insert profile
22 cavity
23 sensor
24 safety switch
3 sliding plate
31 stop pin
32 recess
33 edge
34 cover plate
35 sleeve
36 conical nut
37 locking screws
4 heating foil
41 sandwich construction
44 zigzag structure
42 first woven mat
43 second woven mat
45 liquid ceramic
46 connection wires

What is claimed is:

1. A heatable locking device for aircraft doors and emergency exits, comprising:
   a metallic base body having an insert profile and being mounted on an aircraft structure;
   a metallic lock slide incorporated in a component to be locked and being inserted into the insert profile of the base body when locked;
   said base body having an integrated, inserted metallic sliding plate to enable a sliding movement of the lock slide;
   said sliding plate being hollowed out from a bottom surface thereof in such a way that there remains only a circumferential edge substantially corresponding to the shape of the sliding plate to form a recess for embedding a heating foil for high power density heat transfer per area unit of the sliding plate;
   the hollowed out recess of the sliding plate receiving said heating foil in the form of a sandwich structure in such a way that two temperature resistant woven mats have the heating foil arranged there between; and
   said sliding plate being closed from the bottom with a cover plate circumferentially sealed.

2. The device according to claim 1;
   wherein the recess of the sliding plate with the sandwich construction comprising said heating foil and woven mats is filled with liquid ceramic in order to fill the sliding plate and to achieve a good thermal connection of the heating foil to the sliding plate.

3. The device according to claim 1;
   wherein the sliding plate has a cover plate over its entire surface as a bottom closure which is laser-welded around the circumference in order to achieve a stable and hermetic closure.

4. The device according to claim 3;
   wherein the sliding plate has a sleeve that is welded into the cover plate for guiding through connection wires of the heating foil.

5. The device according to claim 4;
   wherein the sliding plate is screwed to the underside of the base body in a sealing manner by the sleeve by means of a conical nut.

6. The device according to claim 1;
   wherein the heating foil is a metal resistance foil.

7. The device according to claim 6;
   wherein the heating foil is an aluminum-chrome foil.

8. The device according to claim 1;
   wherein the heating foil has a zigzag structure over its entire surface inside the recess of the sliding plate.

9. The device according to claim 1;
   wherein at least one sensor for temperature regulation is arranged in a cavity of the base body for regulating the flow of heat through the heating foil by means of a control unit.

10. The device according to claim 1;
    wherein at least one safety switch, preferably a bimetal switch, is arranged in a cavity of the base body to protect against overheating of the base body and of the heating foil.

11. The device according to claim 10;
    wherein said at least one safety switch is a bimetal switch.

12. The device according to claim 1;
    wherein said two temperature resistant woven mats have a temperature resistance in order to apply heating temperatures higher than 500° C. to the sliding plate and to ensure stable electrical insulation.

* * * * *